United States Patent

Podesva et al.

[11] 3,862,231
[45] Jan. 21, 1975

[54] DIPHENYLPROPYL-SUBSTITUTED 1-AMINO ADAMANTANES

[75] Inventors: Ctirad Podesva; Carola Solomon, both of Montreal, Quebec, Canada

[73] Assignee: Delmar Chemicals Limited, Ville Lasalle, Quebec, Canada

[22] Filed: July 24, 1973

[21] Appl. No.: 382,106

Related U.S. Application Data

[63] Continuation-in-part of Ser. No. 671,935, Oct. 2, 1967.

[30] Foreign Application Priority Data

Oct. 18, 1966 Great Britain.................... 46575/66

[52] U.S. Cl............ 260/570 R, 260/570.6, 424/330
[51] Int. Cl............................................. C07c 87/28
[58] Field of Search ................................ 260/570 R

[56] References Cited
UNITED STATES PATENTS
3,468,951    9/1969    Cho .................................... 260/570

*Primary Examiner*—Robert V. Hines

[57] ABSTRACT

1-Aminoadamantane derivatives of the formula:

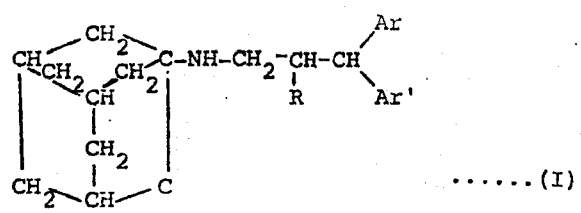

or pharmaceutically acceptable acid addition salts thereof wherein R is hydrogen or lower alkyl, Ar and Ar', which may be the same or different, each represent an unsubstituted phenyl group or a nitro-, halo-, lower alkoxy-, or lower alkyl- substituted phenyl group, are prepared by reacting a 1-(3-phenyl-3-hydroxy-propylamino)-adamantane compound or an acid addition salt thereof with a Lewis acid and a phenyl compound such as, for example, benzene or substituted benzene. The diphenyl propylamino adamantane compounds show central nervous system activity.

9 Claims, No Drawings

DIPHENYLPROPYL-SUBSTITUTED 1-AMINO ADAMANTANES

This application is a continuation-in-part of application Ser. No. 671,935 filed Oct. 2, 1967.

This invention relates to novel 1-diphenylpropyl derivatives of 1-aminoadamantane. This invention also relates to the acid addition salts thereof.

The compounds of the present invention can be represented by the following general formula:

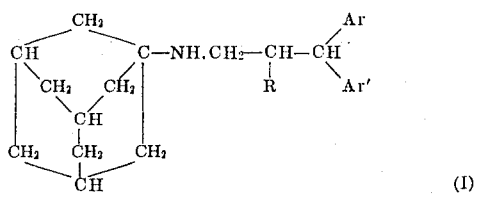

(I)

where Ar and Ar', which may be the same different, each represents an unsubstituted or a substituted phenyl group, the substituents being nitro groups, halogens such as for example, chlorine or bromine, alkoxy groups such as for example, methoxy or ethoxy groups, hydroxy groups, lower alkyl group such as for example, methyl or ethyl group, and R represents a lower alkyl group such as for example, a methyl or ethyl group or hydrogen. In this specification, the term "lower" in the context of "lower alkyl" refers to straight or branched-chain alkyl groups containing 1 to 6 carbon atoms.

The compounds of the present invention may be prepared by a three or four stage process, wherein, in the initial step 1-aminoadamantane, or preferably an acid addition salt thereof, conveniently its hydrochloride, is reacted with formaldehyde or a polymer thereof and a phenyl alkyl ketone, such as, for example, acetophenone or propiophenone, which in turn may be substituted in the aromatic ring by substituents listed above, so as to form the β-adamanthanyl-aminoketones. Thereafter, the ketones are converted into the desired hydroxyl-substituted compounds by reduction. This reduction may be accomplished by any known procedure such as, for example, by reaction with a metal hydride or by catalytic reduction. Optionally these alcohols in turn can be transformed into their corresponding halides by methods known to those skilled in the art, e.g., by treatment with thionyl chloride. Condensation of the above mentioned alcohols or halides with a phenyl compound such as benzene or substituted benzene in presence of a Lewis acid such as for example, anhydrous aluminum chloride produces the desired 1-(3,3-diphenylpropylamino)-adamantanes.

The products of the present invention show a depressing effect on the central nervous system. For instance, they show a strong depressant and sedative activity when administered in low dosage to mice and especially when administered by injection in suspension. As such, they are of potential value as tranquilizers and sedatives. In this role, they can be administered in pharmaceutical form in association or admixture with the usual pharmaceutical carriers.

The bases of the invention can be transformed into equivalent pharmaceutically acceptable acid addition salts, preferred in some cases for ease of administration, by reaction with suitable acids.

DESCRIPTION OF THE PREFERRED EMBODIMENTS

In order that the invention be fully understood, the following examples are given for illustration, but they should not be construed as limiting its scope. The products described were identified by analysis and by spectroscopic methods.

EXAMPLE 1

1-(3,3-Diphenylpropylamino)-Adamantane Hydrochloride

Part A 1-(3-phenyl-3-Oxopropylamino)-Adamantane

A mixture of 47 g. of 1-aminoadamantane hydrochloride, 33 g. of acetophenone and 30 g. of 37 percent aqueous formaldehyde acidified with 2 ml. of concentrated hydrochloric acid was heated under reflux for 4 hours. After cooling to room temperature, the reaction mixture was diluted with acetone and the crystalline 1-(3-phenyl-3-oxopropylamino)-adamantane was collected by filtration. The pure product has a m.p. of 215°C. after recrystallization from a methanol-ether mixture.

Part B 1-(3-Phenyl-3-hydroxypropylamino)-Adamantane Hydrochloride

To a solution of of 8.9 g. of 1-(3-phenyl-3-oxopropyl)-aminoadamantane in 100 ml. of methanol were added 10 ml. of water and 0.7 g. of sodium borohydride. After standing for 3 hours at room temperature, the reaction mixture was diluted with water and the reaction product was extracted into chloroform. Dry hydrochloric acid gas was introduced into the chloroform extract, the solvent distilled off in vacuo and the residue purified by crystallization from a methanol-ether mixture. The pure 1-(3-phenyl-3-hydroxypropylamino)-adamantane hydrochloride had a m.p. of 299° – 302°C.

Part C 1-(3,3-Diphenylpropylamino)-Adamantane Hydrochloride

To a suspension of 5 g. of 1-(3-phenyl-3-hydroxypropylamino)-adamantane hydrochloride in 75 ml. of dry benzene were added in portions 3.11 g. of anhydrous aluminum chloride and the mixture was heated under reflux for 30 mixtures. The cooled reaction mixture was then poured on a mixture of ice and hydrochloric acid and allowed to reach room temperature. The benzene layer was separated, the aqueous layer was made alkaline with aqueous sodium hydroxide, extracted with chloroform, the extract was combined with the previously separated benzene layer and dry hydrogen chloride acid gas was introduced. The solvents were then removed by distillation in vacuo and the residue purified by crystallization from methanol-ethyl acetate. The pure 1-(3,3-diphenylpropylamino)-adamantane hydrochloride has a m.p. of 301° – 304°C.

EXAMPLE 2

The process described in Example 1, Part C, was repeated, using 1-(3-phenyl-3-chloropropylamino)-adamantane instead of 1-(3-phenyl-3-hydroxypropylamino)-adamantane. The same product as in Example 1, Part C, was obtained after working up the reaction mixture.

EXAMPLE 3

1-(3,3-Diphenyl-2-methylpropylamino) -Adamantane Hydrochloride

To a suspension of 2 g. of 1-(3-phenyl-3-hydroxy-2-methyl-propylamino) -adamantane hydrochloride itself prepared by procedures similar to those set forth in Parts A and B of Example 1, in 75 ml. of dry benzene were added in portions 1.2 g. of anhydrous aluminum chloride and the mixture was heated under reflux for 30 minutes. The cooled reaction mixture was then poured onto a mixture of ice and hydrochloric acid and allowed to reach room temperature. The benzene layer was separated, the aqueous layer was made alkaline with aqueous sodium hydroxide and extracted with chloroform, the extract was combined with the previously separated benzene layer and dry hydrogen chloride gas was introduced. The solvents were then removed by distillation in vacuo and the residue purified by crystallization from methanol-ethyl acetate. The pure 1-(3,3-diphenyl-2-methylpropylamino) -adamantane hydrochloride had a melting point of 272°C.

EXAMPLE 4

1-[3-(4-Chlorophenyl) -3-phenylpropylamino] -Adamantane
Hydrochloride

To a suspension of 5 g. of 1-[3-(4-chlorophenyl)-3-hydroxy-propylamino] adamantane hydrochloride itself prepared by a similar procedure to that set forth in Parts A & B of Example 1 in 50 ml. of dry benzene were added in portions 3.2 g. of anhydrous aluminum chloride and the mixture refluxed for 30 minutes. The cooled reaction mixture was then poured onto a mixture of ice and hydrochloric acid and allowed to reach room temperature. The precipitated crystalline product was filtered off and purified by crystallization from a methanol-ethyl acetate mixture. The pure 1-[3-(4-chlorophenyl) -3-phenylpropylamino] -adamantane hydrochloride had a melting point of 304° – 306°C.

In an analogous manner, the following compounds were obtained by essentially the same procedure as set forth in the foregoing Examples.

1-[3,3-bis-(4-chlorophenyl) -propylamino] -adamantane hydrochloride, m.p. 322°C.

1-[3-(4-nitrophenyl) -3-phenylpropylamino] -adamantane hydrochloride, m.p. 234° – 6°C.

1-[3-bis-(4-methoxyphenyl) -propylamino] -adamantane hydrochloride, m.p. 305°C.

1-[3-bis-(4-methylphenyl) -propylamino] -adamantane hydrochloride, m.p. 315°C.

1-[3-(4-hydroxyphenyl) -3-phenylpropylamino] -adamantane hyrochloride, m.p. 319° – 320°C.

What is claimed is:

1. A 1-aminoadamatane derivative of formula I

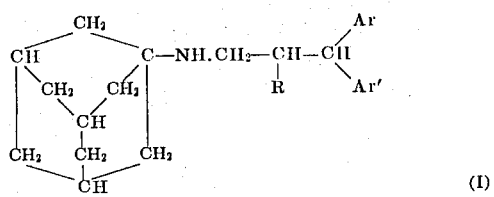

(I)

or a pharmaceutically acceptable acid addition salt thereof. wherein Ar and Ar', which may be the same different, each represent an unsubstituted phenyl group or a mono-nitrosubstituted or mono-halo-substituted or mono-lower alkoxysubstituted or mono-lower alkyl-substituted phenyl group or mono-hydroxy-substituted phenyl group and R represents a hydrogen atom or aa lower alkyl group.

2. 1-(3,3-Diphenyl-2-methylpropylamino) -Adamantane Hydrochloride.

3. 1-[3-(4-Chlorophenyl) -3-phenylpropylamino] -Adamantane Hydrochloride.

4. 1-[3,3-bis-(4-chlorophenyl) -propylamino] -Adamantane Hydrochloride.

5. 1-[3-(4-nitrophenyl)-3-hydroxy plenyl propylamino] -Adamantane Hydrochloride.

6. 1-[3-bis-(4-methoxypenyl) -propylamino] -Adamantane Hydrochloride.

7. 1-(3,3-diphenylpropylamino) -Adamantane Hydrochloride.

8. 1-[3-bis-(4-methylphenyl)-propylamino ]-Adamantane Hydrochloride according to claim 1.

9. 1-[3-(4-hydroxyphenyl)-3-phenylpropylamino]-Adamantane Hydrochloride according to claim 1.

* * * * *